United States Patent [19]
Dragone et al.

[11] Patent Number: 5,625,723
[45] Date of Patent: Apr. 29, 1997

[54] METHOD FOR REDUCING BIREFRINGENCE IN OPTICAL GRATINGS

[75] Inventors: Corrado Dragone, Little Silver; Benjamin I. Greene, Westfield; Thomas A. Strasser, Chatham; Cynthia A. Volkert, Murray Hill, all of N.J.

[73] Assignee: Lucent Technologies Inc., Murray Hill, N.J.

[21] Appl. No.: 396,031

[22] Filed: Feb. 28, 1995

[51] Int. Cl.$^6$ ..................................... G02B 6/12
[52] U.S. Cl. ..................... 385/11; 385/3; 385/37
[58] Field of Search ..................... 385/11, 37, 3; 338/2

[56] References Cited

U.S. PATENT DOCUMENTS

| | | | |
|---|---|---|---|
| 4,406,992 | 9/1983 | Kurtz et al. | 338/2 |
| 5,002,350 | 3/1991 | Dragone | 350/96.15 |
| 5,104,209 | 4/1992 | Hill et al. | 385/27 |
| 5,136,671 | 8/1992 | Dragone | 385/46 |
| 5,216,739 | 6/1993 | Hill et al. | 385/123 |
| 5,341,444 | 8/1994 | Henry et al. | 385/11 |
| 5,367,588 | 11/1994 | Hill et al. | 385/37 |

OTHER PUBLICATIONS

"Increase In Photosensitivity In Silica–Based Optical Waveguides On Silicon", Hibino et al., *Electronics Letters*, vol. 29, No. 7, Apr. 1, 1993, pp. 621–623.

"Laser–Trimmed Four–Port BandpassFilter Fabricated in Single–Mode Photosensitive Ge–Doped Planar Waveguide", Kashyap et al., *IEEE Photonics Technology Letters*, vol. 5, No. 2, Feb. 1993, pp. 191–194.

"Optimal Finite–Aperture Filters With Maximum Efficiency", C. Dragone, *Journal of the Optical Society of America A*, vol. 9, No. 11, 1992, pp. 2048–2055.

Co–pending U.S. patent application Ser. No. 08/396,023, filed Feb. 28, 1995, entitled: "Radiolytic Modification Of Birefringence In Silica Planar Waveguide Structures" (B. I. Greene et al. Case 5–1–3).

Co–Pending U.S. patent application Ser. No. 08/198,915, filed Feb. 18, 1994, entitled: "Spatially–Varying Distributed Bragg Reflectors In Optical Media" (T. Erdogan et al. Case 5–17).

*Primary Examiner*—Rodney B. Bovernick
*Assistant Examiner*—Yisun Song
*Attorney, Agent, or Firm*—Stuart H. Mayer

[57] ABSTRACT

A method for reducing the inherent polarization shift caused by birefringence between the TE and TM modes of an optical signal propagating in an optical grating which has a plurality of waveguides includes the step of: irradiating the waveguides of the optical grating for different periods of time to induce a compensating polarization shift that substantially reduces the inherent polarization shift. If desired, a compensating polarization shift may be induced which not only reduces but also substantially eliminates the inherent polarization shift.

22 Claims, 3 Drawing Sheets

5,625,723

METHOD FOR REDUCING BIREFRINGENCE IN OPTICAL GRATINGS

FIELD OF THE INVENTION

This invention relates generally to a method for reducing birefringence in an integrated optical grating, and more particularly to a method employing a beam of radiation for reducing birefringence in an optical grating.

BACKGROUND OF THE INVENTION

Optical devices such as waveguides, gratings, and switches, for example, are typically fabricated in layers of silica deposited on silicon. One problem that occurs when employing these materials is that strain birefringence arises because of the large thermal expansion coefficient of silicon relative to silica. As a result of this difference, large compressive strains are produced in the silica layers after the requisite annealing step is performed during the fabrication process. The resulting birefringence caused by the strains produce different propagation constants for the TE and TM waveguide modes. Because the modes have different propagation constants, an optical signal propagating in a device with maximum transmission at a given wavelength is split into two components corresponding to the TE and TM modes. The components are thus spaced apart in wavelength and the difference, which is referred to as the polarization shift, is typically about 0.3 nm. A polarization shift of this magnitude is too large for many applications in which optical devices are employed. For example, frequency routing devices having channel spacings of less than 2 nm are required for long-haul or local area networks. For such purposes the routing device typically should have a polarization shift of less than about 0.1 nm.

It is known that birefringence in silica waveguides is affected by irradiation. For example, copending application Ser. No. 08/396,023 entitled *Radiolytic Modification of Birefringence in Silica Planar Waveguide Structures*, filed in the U.S. Patent and Trademark Office on the same date as the present application, discloses a method for reducing or eliminating birefringence in silica waveguides by irradiating the waveguides at a wavelength that induces compaction in the waveguide cladding. In addition, Hibino et al, *Electron. Lett.*, 1993, 29, pp. 621–623, indicates that birefringence can be reduced by irradiating the material at a wavelength which is absorbed by photosensitive defects. Hibino irradiated one of the two waveguides in a Mach-Zehnder interferometer to induce birefringence while shielding the other waveguide with a mask. Because only two, relatively widely spaced waveguides were involved, this arrangement was sufficient to direct the radiation to a selected one of the two waveguides.

The irradiation method disclosed by Hibino is not satisfactory when applied to an integrated optical grating rather than a Mach-Zehnder interferometer. Optical gratings include more than two waveguides (and typically include 10–40 waveguides) which are separated by as little as 50 microns. In this case the waveguides cannot be selectively irradiated by masking individual ones of the waveguides. Moreover, since Hibino simply observes that birefringence is affected by radiation, Hibino provides no criteria that can be applied to determine the relative amounts of radiation that should be imparted to the different waveguides in an optical grating to reduce birefringence.

SUMMARY OF THE INVENTION

The present invention provides a method for reducing the inherent polarization shift caused by birefringence between the TE and TM modes of an optical signal propagating in an optical grating which has a plurality of waveguides. The method includes the step of irradiating the waveguides of the optical grating for different periods of time to induce a compensating polarization shift that substantially reduces the inherent polarization shift. If desired, a compensating polarization shift may be induced which not only reduces but also substantially eliminates the inherent polarization shift.

In one embodiment of the invention, the irradiation step is performed by scanning an irradiating beam across the waveguides at a scanning velocity that differs from waveguide to waveguide. By using a scanning beam, the value of the compensating polarization shift imparted to the individual waveguides may be precisely controlled even when the waveguides are closely spaced to one another.

DETAILED DESCRIPTION

An optical grating is defined as a plurality of waveguides having unequal lengths that provide a predetermined path length difference when traversed by optical signals propagating therein. In some cases adjacent waveguides in the grating all differ in length from one another by a constant predetermined amount. The path length difference imparts a shift in the phase of the optical signals relative to one another. While one of ordinary skill in the art will recognize that the present invention as set forth below is equally applicable to any integrated optical grating, the present invention will be described in terms of an optical grating that is a part of a conventional frequency routing device such as disclosed in U.S. Pat. Nos. 5,002,350 and 5,136,671.

Figures 1, 2:
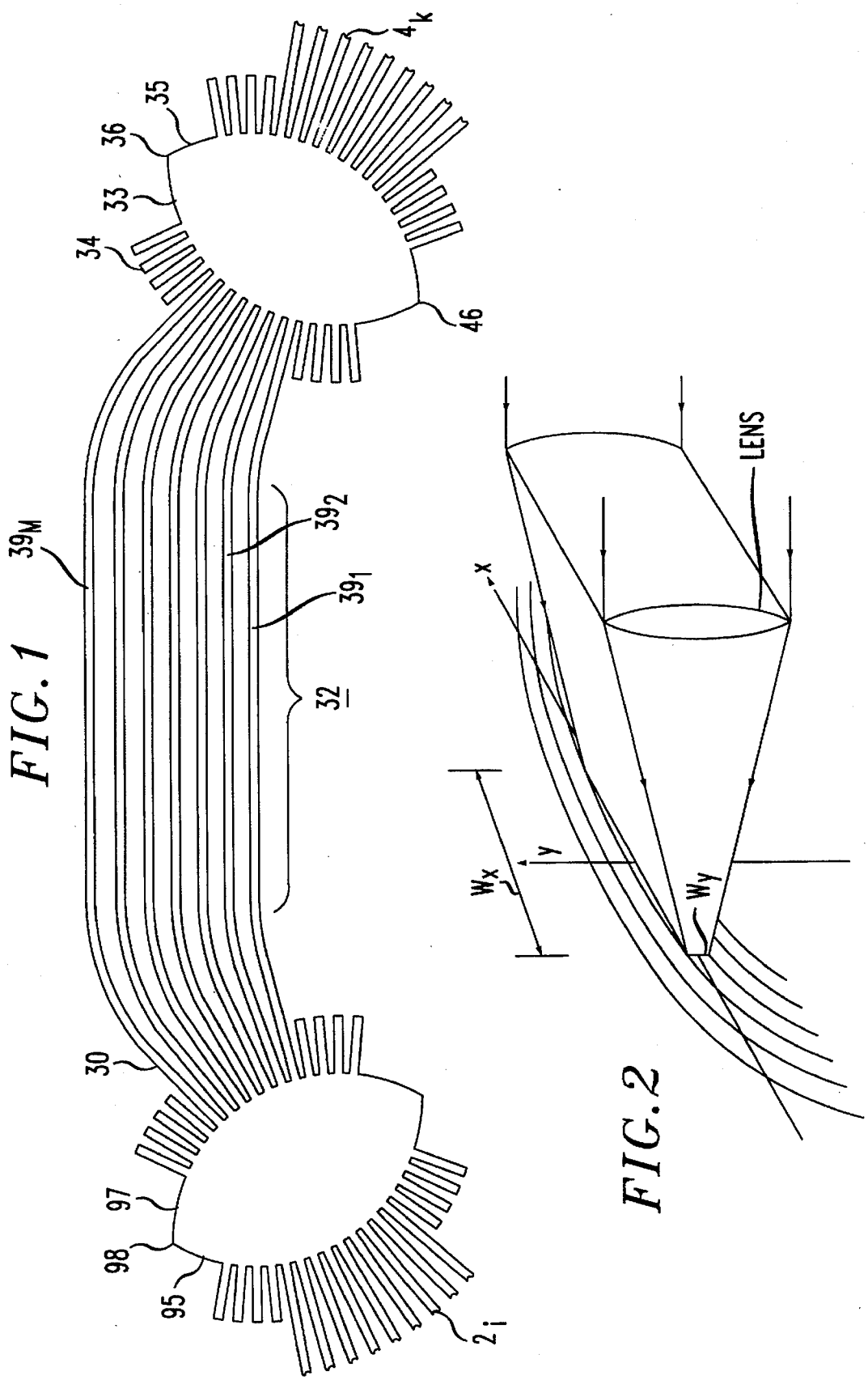
FIG. 1 illustrates an example of a conventional optical frequency routing device.
FIG. 2 shows an optical grating that is illuminated with an irradiation arrangement in accordance with the method of the present invention.

FIG. 1 shows the pertinent details of a conventional frequency routing device. The frequency routing device contains a plurality of input ports $2_i$, i=1, 2, ..., N connected to the input circle 95 of a free space region 98. A plurality of output waveguides 30 extends from the output circle 97 of the free space region 98 and is connected to an optical grating 32. The optical grating 32 comprises a plurality of unequal length waveguides $39_1, 39_2, \ldots 39_M$ which provides a predetermined amount of path length difference to a corresponding plurality of input waveguides 34 connected to the input circle 33 of another free space region 46. The waveguides $39_1, 39_2, \ldots 39_M$ that form the optical grating 32 are denoted sequentially from the shortest waveguide $39_1$ to the longest waveguide $39_M$. The output circle 35 of the free space region 46 is connected to a plurality of output ports $4_k$, k=1, 2, . . . , N. The various input and output ports are formed from waveguides. These frequency routing devices operate as multiplexers and demultiplexers of optical frequencies. Additional details concerning these routing devices are found in the above-referenced patents.

Compressive strains in the silica material of which the integrated optical grating is composed give rise to birefringence. Birefringence in turn gives rise to different propagation constants for the TE and TM modes of an optical wave propagating in the waveguides of the optical grating. The different propagation constants for the TE and TM modes yield a difference in the phase shift experienced by the two modes as they propagate. The relative phase shift between the two modes splits the peaks appearing in the transmission spectrum of the grating into two distinct peaks. The wavelength separation between these peaks will be referred to as the inherent polarization shift observed in the transmission spectrum.

To reduce or even eliminate the inherent polarization shift, the phase shift experienced by the TE and TM modes must be adjusted to compensate for the effects of birefringence. As discussed above, the requisite compensation can be achieved by irradiating the waveguides to induce a compensating polarization shift that cancels the inherent polarization shift. If $b'_s$ denotes the radiation-induced phase shift of the TE mode propagating in the sth waveguide of the optical grating and $b''_s$ denotes the corresponding induced phase shift of the TM mode, then the compensating differential phase shift in the sth waveguide is defined as:

$$a_s = b'_s - b''_s \tag{1}$$

To produce a compensating polarization shift that eliminates the inherent polarization shift due to birefringence, the difference in the compensating differential phase shifts provided to adjacent waveguides in the optical grating must be the same for all adjacent waveguide pairs. That is, $$da_s = a_s - a_{s-1} \tag{2}$$

must be a constant da for all s.

As noted earlier, the compensating differential phase shift induced by irradiation is proportional to the total time that the waveguide is irradiated, all other factors being equal. Accordingly, the criteria set forth above for reducing the inherent polarization shift (i.e., requiring $da_s$ to be a constant for all s) can be fulfilled by illuminating the optical grating with a scanning irradiating beam that scans the optical grating along an axis traversing the individual waveguides of the grating.

As discussed in the previously-referenced patent application Ser. No. 08/396,023, birefringence can be reduced by selecting an irradiation energy that induces compaction in the waveguide cladding. The compaction induced should preferably be between 0.1–0.5%.

FIG. 2 shows one example of an irradiating arrangement in which a beam of suitable radiation is transmitted through a lens. The beam scans along the transverse direction, which in FIG. 2 is defined as the y direction. The lens focuses the radiation beam so that the beam width $W_y$ in the y-direction is appreciably smaller than the beam width in the x-direction. In principle, the beam width $W_y$ should be sufficiently small so that a single waveguide and its immediately surrounding area may be irradiated independently of adjacent waveguides. However, satisfactory results can be achieved if the beam simultaneously irradiates a plurality of adjacent waveguides that together compose a small fraction of the total number of waveguides in the optical grating. For example, if M is the total number of waveguides in the grating and W is the smallest spacing between adjacent waveguides, a suitable choice for the beam width is $W_y < (M/5)W$. Factors to be considered in selecting an appropriate beam width $W_x$ will be discussed below.

The value of the compensating differential phase shift $a_s$ imparted to a given waveguide s of the grating by irradiation is approximately proportional to the beam intensity, the effective length $P_s$ of the waveguide s, and the total time $t_s$ over which that length is irradiated. To ensure that the value of $da_s$ is a constant for all s, a compensating differential phase shift $a_s$ must be imparted that increases in a sequential manner from the first waveguide s=1 to the last waveguide s=M (i.e., $a_2 = a_1 + \Delta_a$, $a_3 = a_1 + 2\Delta_a$, etc.). Thus the irradiation time $t_s$ for the individual waveguides must approximately increase linearly with s. Since in FIG. 2 s increases in the direction of the coordinate y, this criteria amounts to requiring that the irradiation time increase as the position of the beam increases in the y direction. If, for instance, the waveguides are equally spaced, $$t(y) = \alpha_o + \alpha_1 y \tag{3}$$

where $\alpha_o$ and $\alpha_1$ are suitable coefficients. If the irradiating beam scans along the transverse direction with a velocity $v(y)$, the irradiation time $t_s$ for a given waveguide will be inversely proportional to the velocity $v(y)$ at the location of waveguide s. More particularly, $t(y) = w_x/V(y)$. Accordingly, the required irradiation time can be expressed as follows:

$$t(y) = w_{y+i}/v(+i\ y) = \alpha_o + \alpha_1 y \tag{4}$$

Equation 4 assumes that the waveguides are equally spaced from one another. This assumption may be removed by replacing the coordinate y in equation 4 with some function of y this is nonlinear with respect to s and which represents the nonlinear separation between the waveguides. The above discussion also assumes for simplicity that the beam scans continuously. However the above considerations are equally applicable if the beam motion is discontinuous. i.e., if it proceeds in discrete steps.

In practice, the effective length $P_s$ of the waveguide s that is irradiated will differ from waveguide to waveguide since the waveguides are in general curved (see FIG. 1). As a result a correction factor must be introduced into the above expression for the scanning time $t_s$ to account for the variation in $P_s$ with s. The correction factor can be calculated from the geometry of the optical grating in a straightforward manner by recognizing that when the beam illuminates the central section of a given waveguide it also illuminates the curved sections of nearby waveguides above the given waveguide. Thus, the correction factor may be determined by taking into account this additional exposure that the waveguides receive before the beam illuminates its central section. However, the correction factor also may be determined experimentally by initially exposing the device to an irradiating beam having a scanning velocity given by equation (4) without any correction factor, measuring the remaining polarization shift exhibited by the transmission spectrum of the grating, and then calculating the additional irradiation necessary to eliminate the remaining polarization shift. For typical geometries, the required correction factor will be small.

It was noted above that the beam width $W_y$ in the transverse direction is advantageously chosen to be sufficiently narrow to selectively irradiate only a small number of adjacent waveguides at any given time. The beam width $W_x$ in the x direction (i.e., the direction more nearly parallel to the optical propagation direction) typically must be larger than $W_y$. If the shortest waveguide in the optical grating is denoted by s=1 and is imparted with a compensating differential phase shift $a_1$, then the longest waveguide denoted by s=M must be imparted with a differential phase shift $a_M$ equal to:

$$a_m = (M-1)da + a_1 \quad (5)$$

This value of $a_M$ is necessary to ensure that $a_s$ varies linearly with s for all s between s=1 and s=M. Since for most practical optical gratings M>10, the value of $a_M$ will be generally much larger than $a_1$. The effective length $P_s$ of the waveguide that is irradiated, and hence the width $W_x$ of the beam, must be sufficiently large to ensure that a compensating differential phase shift $a_M$ can be produced under realistic irradiation conditions without the need for inducing large refractive index changes. Of course, this analysis assumes that the irradiating beam scans solely in the transverse direction. If the beam additionally scans in the orthogonal direction (i.e., the x direction), then the width $W_x$ of the beam in this direction can be reduced.

The above-described irradiation procedure for reducing birefringence is a nondestructive and reversible process. That is, after irradiation the device may be annealed to partially or completely eliminate the compensating polarization shift that results from the collective effects of the compensating differential phase shifts, thus returning the device to its original state. Consequently, the polarization shift due to birefringence may be reduced or completely eliminated in a simple manner by first overexposing the device and then annealing it. For instance, by monitoring the decay in the compensating polarization shift during the annealing step, annealing can be terminated when precisely the correct value has been achieved.

The optical grating must undergo an annealing process subsequent to the irradiation process for an additional reason independent of that discussed above. After the optical grating is irradiated the compensating polarization shift is found to exhibit significant decay. However, the compensating polarization shift apparently stabilizes after decaying approximately 10–20%. By extrapolating the decay data it is anticipated that no additional decay will occur over the remaining lifetime of the device (i.e., over twenty years). Thus, to provide a stable device at the outset the initial decay can be accelerated by overexposing the device by 10–20% so that it is overcompensated by an amount equal to the initial decay and then annealing it. By choosing a suitable annealing temperature, such as between 100°–300° C., for example, the initial decay can be achieved in a reasonably short period of time, often in the range of approximately 15 minutes. As a result, a device is realized in which birefringence is reduced or eliminated and which is stable immediately upon fabrication.

Moreover, rather than annealing the device after it has been irradiated, the device may simultaneously undergo both the irradiation and annealing steps. If the value of the compensating polarization shift is monitored while the grating is being irradiated and annealed, the procedure may be terminated once the inherent polarization shift has been eliminated. The resulting device will be stable without undergoing any additional annealing. By performing the irradiation and annealing steps simultaneously, the fabrication process is simplified and the total time required is reduced. Moreover, once the various parameters such as exposure time, annealing time and annealing temperature have been determined for one device, these same parameters may be used to impart the requisite compensating polarization shift in all other devices having identical configurations.

The method described above reduces or eliminates the inherent polarization shift caused by birefringence which is observed in the transmission spectrum of an optical grating. The transmission spectrum exhibits other aberrations, however, which are not caused by birefringence but which also may be eliminated by irradiation. Such aberrations are caused by phase errors in the individual waveguides of the grating typically due to imperfect manufacture. These aberrations manifest themselves as distortions in the shape of the transmission function. Although the aberrations are usually small, they can substantially increase the level of crosswalk and distort the pass band. As noted earlier, irradiation induces phase shifts $b'_s$ and $b''_s$ in the TE and TM modes respectively. Accordingly, irradiation may be used to reduce or eliminate phase errors by selectively adjusting $b'_s$ and $b_s''$ with radiation. However, unlike the situation discussed above in which a substantial difference between the induced phase shifts $b'_s$ and $b''_s$ was required to reduce the inherent polarization shift, in the case of phase errors irradiation is ideally used to selectively adjust $b'_s$ and $b''_s$ so that they are as nearly equal as possible. The reason $b'_s$ and $b''_s$ should be nearly equal to one another is because aberrations due to phase errors are not in general strongly polarization dependent and therefore the selective adjustment of the induced phase shifts $b'_s$ and $b''_s$ for the TE and TM modes, respectively, should be approximately the same. For example, if the induced phase shifts satisfy the relation $b'_s > 2b''_s$, phase errors in the TE mode may be completely eliminated while only eliminating less than 50% of the phase errors in the TM mode.

Figure 3:
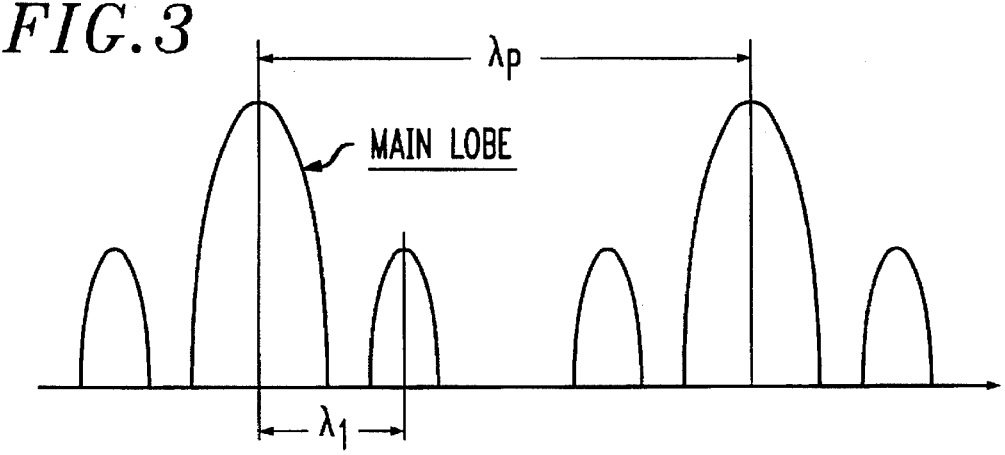
FIG. 3 shows an illustrative example of a transmission spectrum produced by an optical grating that is part of a conventional frequency routing device.

The illustrative transmission spectrum shown in FIG. 3 shows a main lobe situated between two sidelobes. The sidelobes, which are undesirably large, are primarily due to phase errors. Since the sidelobes are the result of phase errors they are essentially symmetrically located about the main lobe with the same amplitudes. This symmetry arises whenever the transmission spectrum exhibits behavior primarily caused by phase errors. In such cases any steps which are taken to correct the errors on one side of the main lobe will also correct the errors on the other side of the main lobe.

Due to competing factors it is not possible to completely eliminate both the inherent polarization shift due to birefringence and aberrations due to phase errors. When reducing the inherent polarization shift the compensating polarization shift depends on the quantity $a_s = b'_s - b''_s$. Accordingly the ratio $r = b'_s/b''_s$ should be appreciably greater than unity since otherwise large value of $b''_s$ will be required to produce the requisite value of $a_s$. In contrast, as noted above, to correct aberrations due to phase errors the ratio r should be close to unity. Therefore a value of r should be chosen which represents a compromise between the two competing concerns. In practice, a value of r between 2 and 3 has been found to be a reasonable compromise.

It should be noted that the actual value of r depends in general on both the exposure conditions and the router design and fabrication. In particular, r depends on the strain distribution in the grating, which is often highly uniform in the vicinity of the individual waveguides. Typically, for example, the top and bottom cladding layers have different compositions and therefore highly nonuniform strain is produced in the vicinity of the individual waveguides. As a consequence, the initial strain before irradiation depends in general on both the composition of the top layers and the core dimensions. Similarly, the induced birefringence can be highly nonuniform since compaction induced by irradiation will also depend on the composition of the top layers and the core dimensions. Therefore, it is possible to change the coefficients $b'_s$ and $b''_s$ by properly modifying the core dimensions and the top cladding composition in the central region of the grating.

To adequately remove aberrations due to phase errors it is sufficient to adjust (by reducing or increasing) the TE transmission coefficient at or near selected wavelengths. Therefore the phase shifts that must be induced will be the sum of a series of components which each reduce a particular distortion component in the shape of the transmission function, as discussed in C. Dragone, *Optimal Finite-Aperture Filters with Maximum Efficiency*, Journal of the Optical Society of America A, vol. 9, No. 11, pp. 2048–2055, 1992. The phase shift to be induced in the individual waveguides of the optical grating will be of the form $$\delta C \cos[2\pi s\alpha - b], \quad \alpha = \lambda_1/\lambda_p \tag{6}$$

where as before s denotes the individual waveguides constituting the optical grating and it varies between 1 and M−1, $\delta C$ is determined by the amplitude of the sidelobes of the transmission function (see FIG. 3), $\lambda_1$ is the difference between the center wavelength of the main lobe and the center of the sidelobe, and $\lambda_p$ is the free spectral range of the transmission spectrum. Of course, since the induced phase shift can never be negative in value, a positive constant term must be added to expression 6 to ensure that it is always positive-valued.

To achieve an induced phase shift that varies sinusoidally with respect to s, as required by expression 6, the irradiation time t(y) given by expression 4 must approximately vary sinusoidally. Denoting by t(y) the scanning time required to alleviate the effects of the inherent polarization shift due to birefringence and t'(y) the sinusoidally-varying scanning time required to alleviate aberrations due to phase errors, the actual scanning time $t_r(y)$ required to compensate for both types of aberrations is the sum of the two time components:

$$t_r(y) = t(y) + t'(y) \tag{7}$$

Figure 4A:
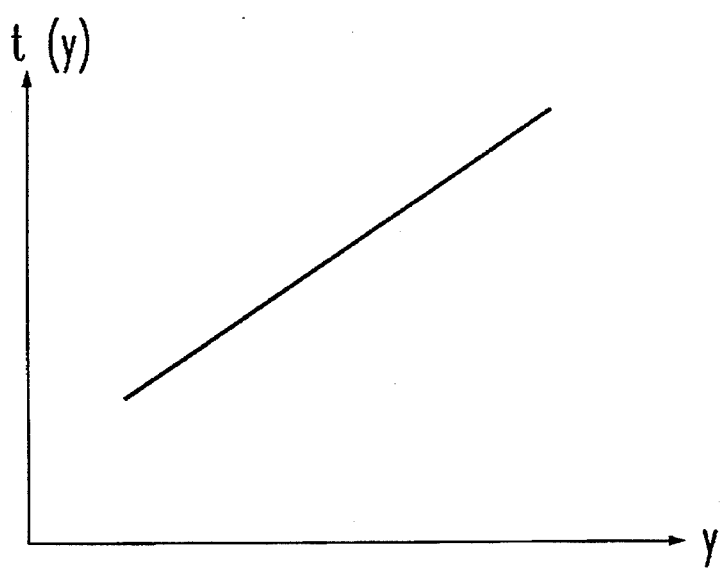
FIG. 4($a$) shows a graph of the scanning time for the irradiation arrangement shown in FIG. 2 which is used to compensate for birefringence and FIG. 4($b$) shows a graph of the scanning time which is used to compensate for both birefringence and aberrations due to phase errors.
Figure 4B:
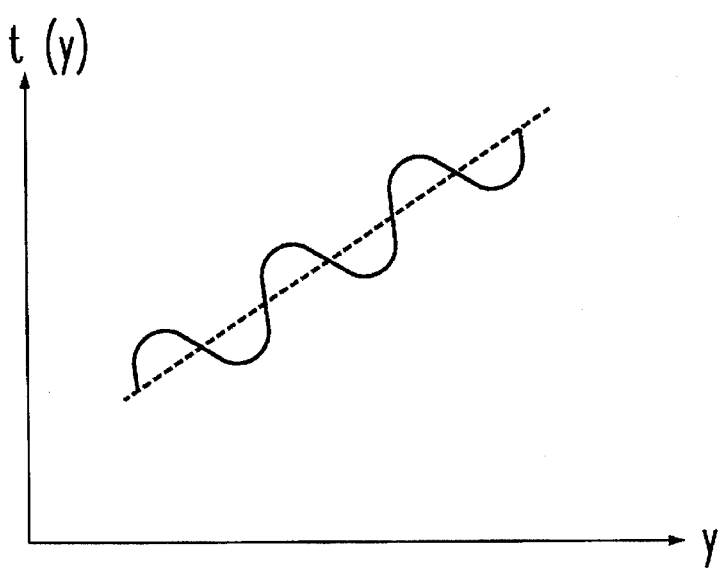

FIG. 4(a) shows a graph of the scanning time t(y) that is required in the special case where $y_s$ is a linear function of s. As discussed earlier t(y) approximately increases linearly as s increases. FIG. 4(b) shows a graph of the scanning time $t_r(y)$ which is required to compensate for both birefringence and phase errors. In accordance with equations 6 and 7, $t_r(y)$ is approximately a linearly increasing function of s on which a sinusoidal component is superimposed. The value of angle b in equation (6) may be experimentally determined by adjusting the phase of the sinusoidal component seen in FIG. 4(b) until the optimal value of the angle b is reached which minimizes the amplitude of the sidelobes. In practice the optimal angle b can be determined by examining two particular cases, namely, a scanning time corresponding to b=0 and a scanning time corresponding to b=π/2.

Figure 6:
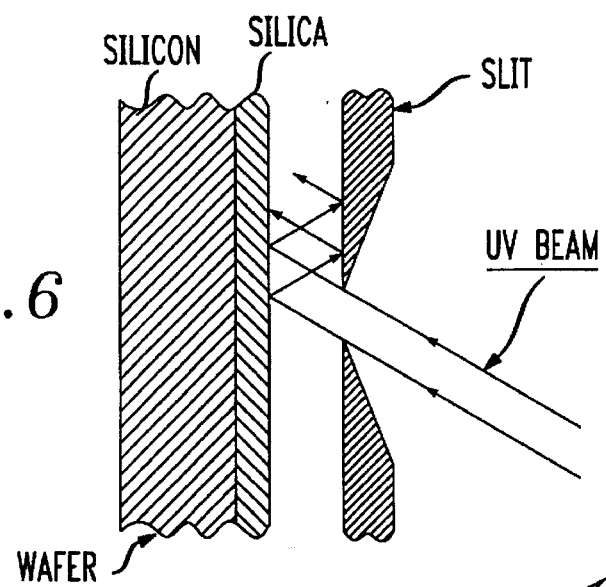
FIG. 6 shows a detailed view of the slit and optical grating shown in FIG. 5 in which multiple reflections are absorbed by the grating to increase efficiency.

It should be noted that the problems of reducing crosstalk and the problems of reducing birefringence differ in several respects. First, the total exposure time is typically smaller in the former case than in the latter since crosstalk is typically small. Second, the former problem requires a higher resolution. In fact, to efficiently correct an aberration component corresponding to a given value of $$U_1 = \lambda_1/\lambda_p$$

requires that $W_y < W/4U_1$, where W is smallest spacing between the waveguides along the y-axis. Therefore the required width $W_y$ becomes small (close to W) when $4U_1$ is close to unity. Often, the most important aberrations are those close to the main lobe of the transmission coefficient and, for these aberrations, the above condition may not be difficult to satisfy. On the other hand, if $4U_1$ is not small, then it may be advantageous to accurately produce the required value of the beam width by transmitting the irradiating beam through a slit of width $W_y$ as shown in FIG. 6. If this arrangement is used the relative motion between the irradiating beam and the optical grating can be achieved by moving the optical grating while keeping the irradiating beam and the slit fixed in position.

In view of differences between reducing birefringence and reducing crosstalk it may be advantageous to employ different irradiation steps for each one. For example, instead of irradiating the waveguides in a single scan, it may be desirable to scan the waveguides two or more times, with each scan imparting a particular correction.

Figure 5:
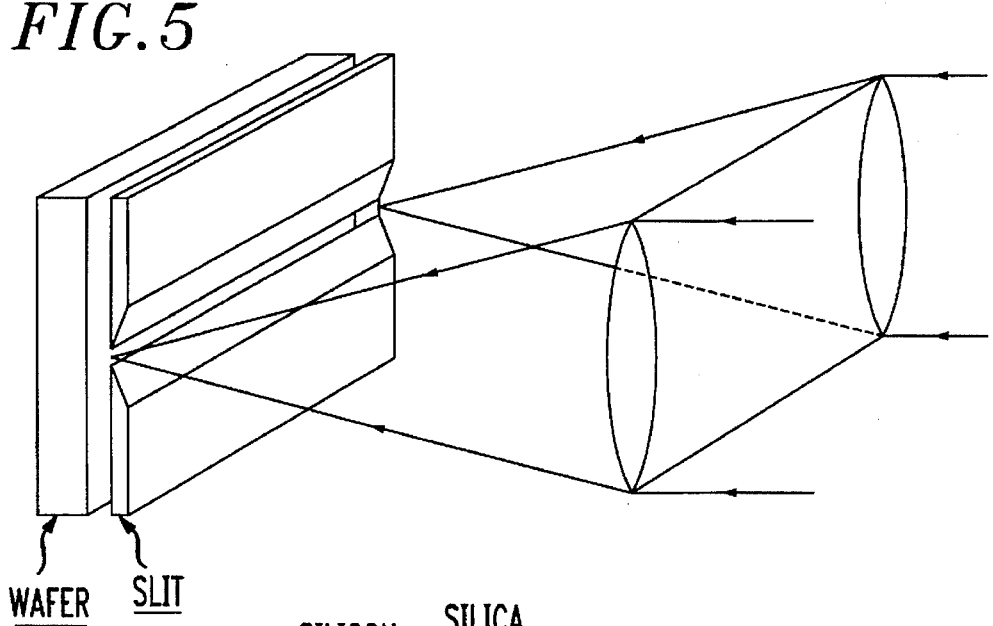
FIG. 5 shows an alternative irradiation arrangement that employs a slit through which the radiation passes before reaching the optical grating.

An important parameter that affects the exposure efficiency is the fraction of the total power from the irradiating source that is absorbed by the optical grating. Typically, the absorption coefficient of silica varies with the wavelength of the radiation and the particular composition of the silica. Generally, the absorbance is relatively low. It may therefore be advantageous to increase the efficiency of the method by employing multiple reflections from the slit shown in FIG. 5. That is, as seen in FIG. 6, radiation transmitted through the slit, reflected off the grating and then off the slit, may be subsequently absorbed by the waveguides.

Figure 7:
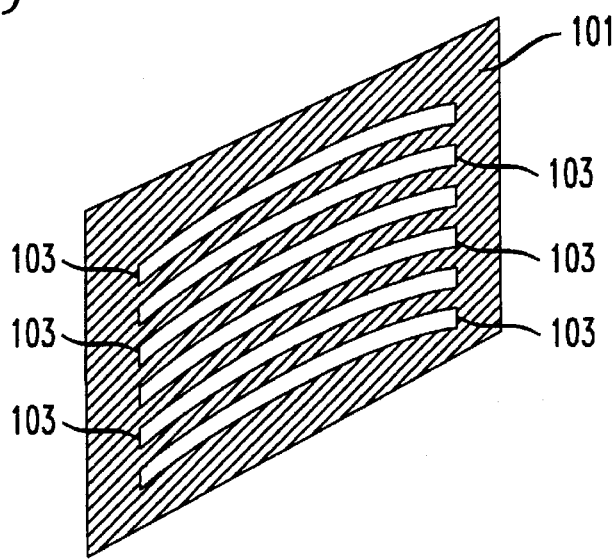
FIG. 7 shows a mask that may be placed over the optical grating to produce a periodic variation that approximates the required sinusoidal induced phase shift.

To improve exposure accuracy and simply the exposure conditions, a mask 101 such as shown in FIG. 7 may be employed. Of particular concern for most applications are the first two sidelobes. In practice, it is often difficult to control the fabrication process to the accuracy required to keep these two sidelobes lower than the specified level. Thus the use of a mask may particularly significant to reduce these sidelobes. The mask is designed to produce a pattern of exposed strips 103 which are arranged so as to approximately produce the periodicity specificed by equation 6. Each strip 103 is a transparent region that is approximately placed at one of the maxima specified by equation 6. The desired compensation may be produced by covering the waveguide with the mask and irradiating the entire grating. Thus, the mask can produce a periodic variation that approximates the sinusoidal induced phase shift, as discussed above.

We claim:

1. A method for reducing the inherent polarization shift caused by birefringence between the TE and TM modes of an optical signal propagating in an optical grating having a plurality of waveguides, said method comprising the steps of:

irradiating the waveguides of the optical grating at a specifiable wavelength and intensity for different periods of time to induce a compensating polarization shift that substantially reduces the inherent polarization shift, wherein said compensating polarization shift results from differential phase shifts induced in the waveguides; and selecting the different periods of time so that differences in said differential phase shifts between pairs of adjacent waveguides are substantially equal.

2. The method of claim 1 wherein said compensating polarization shift substantially eliminates the inherent polarization shift.

3. The method of claim 1 wherein the irradiation step comprises the step of illuminating the optical grating by scanning an irradiating beam across the waveguides at a scanning velocity that differs from waveguide to waveguide.

4. The method of claim 3 further comprising the step of decreasing the scanning velocity as the irradiating beam scans from a shortest of the waveguides to a longest of the waveguides.

5. The method of claim 3 wherein said irradiating beam has a width in the direction of the scanning velocity that is no greater than approximately one-fifth of the total number of waveguides constituting the optical grating multiplied by the distance between adjacent waveguides.

6. A method for reducing the inherent polarization shift caused by birefringence between the TE and TM modes of an optical signal propagating in an optical grating having a plurality of waveguides, said method comprising the steps of:

irradiating the waveguides of the optical grating at a specifiable wavelength and intensity for different periods of time to induce a compensating polarization shift that substantially reduces the inherent polarization shift, wherein said compensating polarization shift results from differential phase shifts induced in the waveguides;

selecting the different periods of time so that the differences in said differential phase shifts between pairs of adjacent waveguides have a prescribed relationship to one another; and annealing the optical grating subsequent to the irradiation step until the compensating polarization shift decays to a substantially stable value.

7. A method for reducing the inherent polarization shift caused by birefringence between the TE and TM modes of an optical signal propagating in an optical grating having a plurality of waveguides, said method comprising the steps of:

irradiating the waveguides of the optical grating at a specifiable wavelength and intensity for different periods of time to induce a compensating polarization shift that substantially reduces the inherent polarization shift, wherein said compensating polarization shift results from differential phase shifts induced in the waveguides;

selecting the different periods of time so that the differences in said differential phase shifts between pairs of adjacent waveguides have a prescribed relationship to one another; and annealing the optical grating simultaneously with the irradiation step.

8. The method of claim 6 wherein the annealing step is performed at a temperature of approximately 100–250° C.

9. The method of claim 7 wherein the annealing step is performed at a temperature of approximately 100–250° C.

10. The method claim 1 further comprising the steps of:
  overexposing the waveguides to radiation so that the compensating polarization shift is greater than required to substantially eliminate the inherent polarization shift;
  annealing the optical grating until the compensating polarization shift decays to a stable value that substantially eliminates the inherent polarization shift.

11. The method of claim 10 wherein said compensating polarization shift results from differential phase shift induced in the waveguides and wherein the stable value of the compensating polarization shift is selected so that differences in said differential phase shifts between pairs of adjacent waveguides are substantially equal.

12. A method for reducing the inherent polarization shift caused by birefringence between the TE and TM modes of an optical signal propagating in an optical grating having a plurality of waveguides, said method comprising the steps of:

irradiating the waveguides of the optical grating at a specifiable wavelength and intensity for different periods of time to induce a compensating polarization shift that substantially reduces the inherent polarization shift, wherein said compensating polarization shift results from differential phase shifts induced in the waveguides;

selecting the different periods of time so that the differences in said differential phase shifts between pairs of adjacent waveguides have a prescribed relationship to one another; and irradiating the waveguides for additional periods of time to reduce transmission spectrum aberrations caused by phase errors.

13. The method of claim 12 wherein said additional periods of time impart an induced phase shift in the waveguides that varies sinusoidally along the waveguides.

14. The method of claim 13 wherein said induced phase shift varies sinusoidally with a phase selected to minimize the amplitude of sidelines appearing in the transmission spectrum of the optical grating.

15. A method for reducing the inherent polarization shift caused by birefringence between the TE and TM modes of an optical signal propagating in an optical grating having a plurality of waveguides, said method comprising the step of:

irradiating the waveguides of the optical grating with spatially nonuniform amounts of radiation by scanning an irradiation beam of substantially constant intensity across the waveguides at a scanning velocity that differs from waveguide to waveguide to induce a compensating polarization shift that substantially reduces the inherent polarization shift.

16. A method for reducing the inherent polarization shift caused by birefringence between the TE and TM modes of an optical signal propagating in an optical grating having a plurality of waveguides each having a core and cladding, said method comprising the steps of:

irradiating the waveguides of the optical grating at a specifiable wavelength and intensity for different periods of time to induce a compensating polarization shift that substantially reduces the inherent polarization shift, wherein said compensating polarization shift results from differential phase shifts induced in the waveguides;

selecting the different periods of time so that the differences in said differential phase shifts between pairs of adjacent waveguides have a prescribed relationship to one another;

selecting an irradiation energy that induces compaction in the cladding; and irradiating the waveguide structure with radiation having an energy equal to said irradiation energy to induce a reduction in birefringence.

17. The method of claim 16 wherein the energy selecting step comprises the step of selecting an irradiation energy sufficient to induce at least 0.1%–0.5% compaction in the cladding.

18. The method of claim 13 further comprising the step of inserting a mask over the optical grating to produce a periodic variation that approximates the sinusoidal induced phase shift.

19. The method of claim 6 wherein the waveguides are overexposed to radiation during said irradiating step so that the compensating polarization shift is greater than required to substantially eliminate the inherent polarization shift.

20. The method of claim 19 wherein at the substantially stable value, the inherent polarization shift is substantially eliminated.

21. The method of claim 15 wherein the waveguides are overexposed to radiation during said irradiating step so that the compensating polarization shift is greater than required to substantially eliminate the inherent polarization shift, further including a step of annealing the optical grating until the compensating polarization shift decays to a substantially constant value.

22. The method of claim 21 wherein at the substantially stable value, the inherent polarization shift is substantially eliminated.

* * * * *